Figure 1:
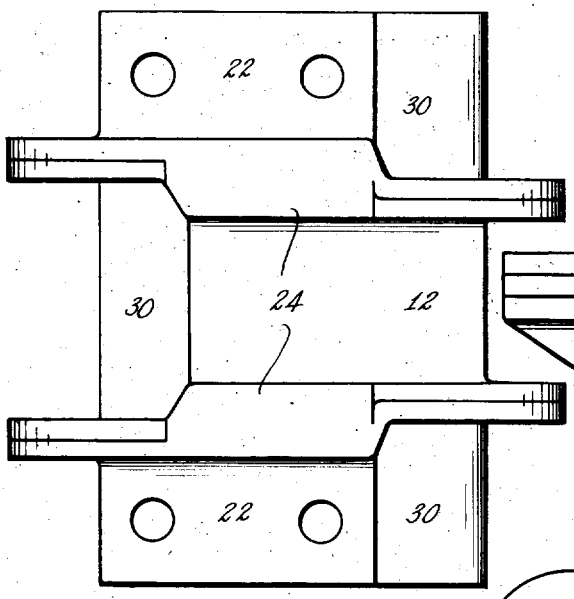

March 11, 1924. Re. 15,790

E. GRUBER

UNIT FOR TRACK BELTS

Original Filed March 31, 1919 2 Sheets-Sheet 1

INVENTOR
EDWARD GRUBER.
BY
Wayne M. Hart
ATTORNEY

March 11, 1924. Re. 15,790

E. GRUBER

UNIT FOR TRACK BELTS

Original Filed March 31, 1919 2 Sheets-Sheet 2

INVENTOR
EDWARD GRUBER
BY
Wayne M. Hart.
ATTORNEY

Reissued Mar. 11, 1924. Re. 15,790

UNITED STATES PATENT OFFICE.

EDWARD GRUBER, OF LYNDHURST, OHIO, ASSIGNOR TO THE CLEVELAND TRACTOR COMPANY, OF EUCLID, OHIO, A CORPORATION OF OHIO.

UNIT FOR TRACK BELTS.

Original No. 1,359,499, dated November 23, 1920, Serial No. 286,265, filed March 31, 1919. Application for reissue filed January 23, 1922. Serial No. 531,270.

*To all whom it may concern:*

Be it known that I, EDWARD GRUBER, a citizen of the United States, residing at Lyndhurst, in the county of Cuyahoga and State of Ohio, have invented a certain new and useful Improvement in Units for Track Belts, of which the following is a full, clear, and exact description.

This invention is an improvement upon the track unit or link which is shown and described in the Patent 1,317,896 to E. H. Savage, issued October 7, 1919, the principal object being to increase the strength and durability of the link sides of said unit, and to diminish the chance that the horizontal flanges at the upper edges of said link sides, which serve as bearing surfaces or rail tops for the truck wheels shall be so mutilated and deformed in use that they cannot satisfactorily serve the purpose for which they are provided.

The invention consists in the combination of parts shown in the drawing and hereinafter described, as definitely pointed out in the appended claims.

Figure 4:
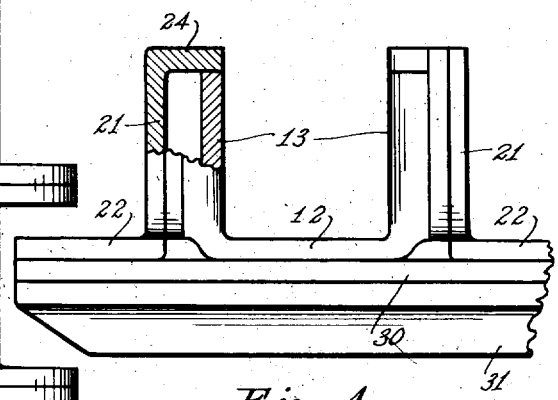
Figure 3:
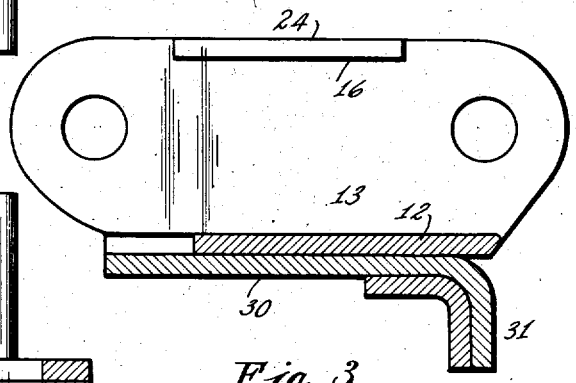
Figure 2:
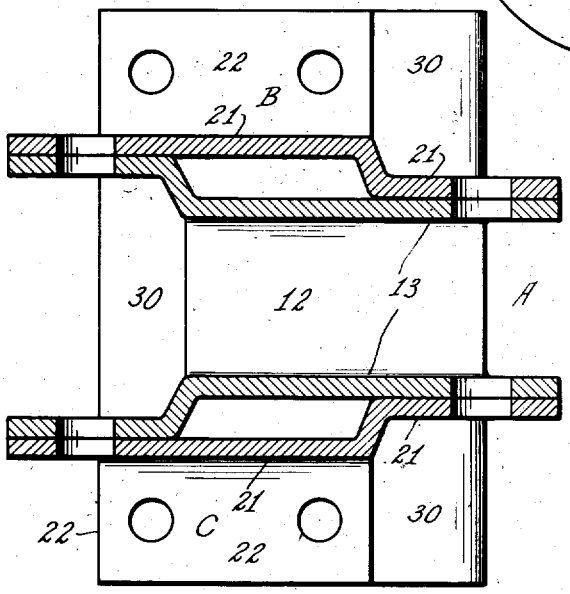
Figure 5:
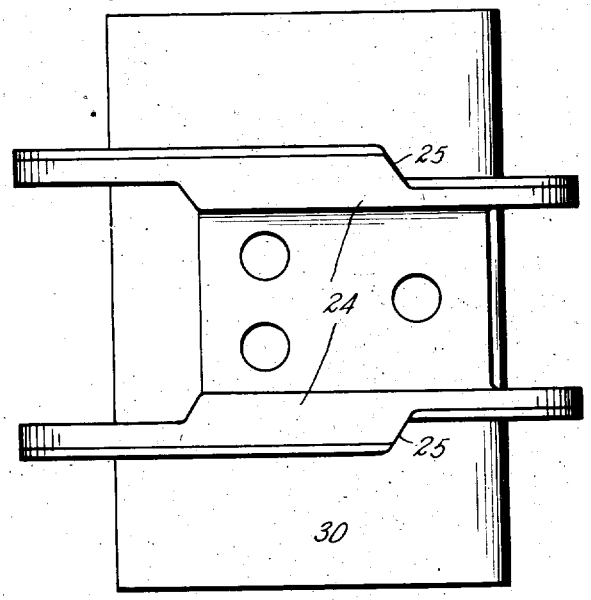
Figure 6:
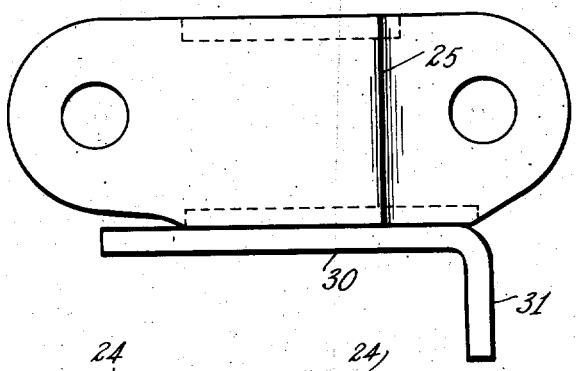
Figure 7:
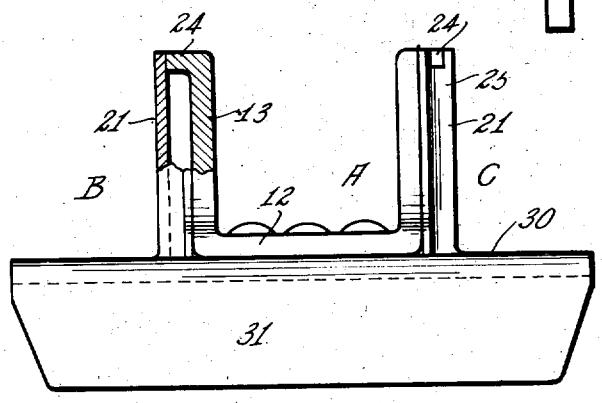

In the drawing, Figure 1 is a plan view of a track unit embodying the invention; Fig. 2 is a sectional plan view; Fig. 3 is a longitudinal central vertical section, and Fig. 4 is a rear end view of said unit; Fig. 5 is a plan view of a modified construction; Fig. 6 is a side elevation thereof, and Fig. 7 is a front elevation partly broken away and sectioned.

The link comprises three members, viz: the middle member A and the two side members B and C, all made from metal sheets bent into the forms shown and secured together. The middle member A has the form of a substantially square U, and is so formed by bending up the sides of the metal plate, thereby producing the flat bottom or shoe portion 12, and the two vertical longitudinally extended rails 13.

The two side members B and C are alike except that they are rights and lefts. Each has a vertical longitudinally extended rail 21; and may have a horizontal shoe portion 22, of which the rail is an integral part, as shown in Fig. 4; or it may not as shown in Figs. 5 to 7. These rails are so shaped that when the three pieces are placed side by side the rails 13 and 21 will be in contact near the front end of the unit, and near the rear end of the unit; but the parts of the rails between said contacting front and rear ends are spaced apart. This results from the fact that the rails 13 near their rear ends are offset apart; and the rails 21 near their front ends are offset toward one another. The offset portions are, however, parallel with each other and with the rails from which they are offset. When the rails are placed together as stated, the offset front ends of the rails 21 engage with the outer faces of the front ends of the rails 13 and are connected with them by spot welding, rivets and the like. The offset rear ends of the rails 13 will likewise engage the inner faces of the rails 21, and these engaging parts are connected together by spot welding, rivets or the like.

The offset parts of said rails at the front and rear ends of the unit, together with the parts of the rails which contact with and are secured to said offset parts constitute double thick ears. These ears at the rear ends of the unit are farther apart than those at the front end of the unit; and therefore the ears at the front end of the unit may go between the ears at the rear end of the adjacent unit; and the overlapping ears may be pivoted together by any suitable or well known means.

The part of one rail which is spaced away from the associated rail is formed with a turned over horizontal flange 24 along its upper edge which flange extends over and rests upon a part of the companion rail. Preferably the flanges 24 are on and parts of the rail 21; and preferably also the rails 13 have each a recess 16 cut out of its upper edge into which a flange 24 is fitted, so that the upper surface of the said flange is flush with the upper edge of the rail 13.

These flanges form strong, well braced, broad surfaces for the track wheels to ride on, and they are so constructed and supported that there is practically no chance that they will become deformed by use to an extent such as will render them inefficient for the purpose for which they are provided.

In the construction shown a shoe 30 is provided. This is a flat metal plate whose side edges are coincident with the side edges of the shoe portions of the members B and C, and these shoe portions of said members rest upon the shoe as does the middle portion of the member A. The shoe is secured to these parts by shot welding, bolts, rivets or the like.

The front edge of this attached shoe may be turned down to form the ground engaging rib or grouser 31.

In the modified construction shown in Figs. 5 to 7 the members B and C have no shoe portions, but are in most other respects substantially like the said members as shown in Figs. 1 to 4 inclusive. The horizontal flanges 24 are, however, formed on the upper edges of the rails 13; and these flanges rest only on the top of the offset web 25 of the rail 21.

As shown in Figs. 5 to 7, the shoe 30 is only connected with the middle member A.

Having described my invention, I claim:

1. A track belt unit comprising three metal members arranged side by side and connected together, viz, a middle member having along its side edges vertical longitudinally extended side rails, and two side members each having a vertical longitudinally extended rail which is secured to a rail of the middle member, the rails which are so secured together being in contact at their front and rear ends and being spaced apart between said contacting ends, the upper edge of one of said spaced apart rails being formed with a horizontal flange which overlies and engages a part of the upper edge of the associated rail.

2. A track belt unit comprising three metal members which are arranged side by side and are connected together, viz, a middle member having along its sides vertical longitudinally extended rails which at their rear ends are offset apart, and two side members each having a vertical longitudinally extended rail which engages and is secured to the inner face of the offset part of a rail of the middle member,—the rails of said side members at their front end being offset toward one another,—said offset parts being in engagement with the outer faces of the associated rails of the middle member, the upper edge of one of the rails of each pair of connected rails being formed with a horizontal flange which overlies and engages the upper edge of the associated rail.

3. A track belt unit comprising three metal members arranged side by side and connected together, viz, a middle member having along its side edges vertical longitudinally extended side rails, and two side members each having a vertical longitudinally extended rail which is secured to a rail of the middle member, the rails which are so secured together being in contact at their front and rear ends and being spaced apart between said contacting ends, the upper edge of one of said spaced apart rails being formed with a horizontal flange which overlies and engages the upper edge of the associated rail, and a shoe upon which said three members are secured, which shoe has at its front end an integral downwardly bent and transversely extended ground engaging rib.

4. In a track belt unit, a shoe, a central rail member having a base secured to said shoe and upturned sides forming rails, and side rail members having a base secured to said shoe and upturned sides forming rails.

5. In a track belt unit, a shoe, a central rail member having a base secured to said shoe and upturned sides forming rails, and side rail members having a base secured to said shoe and upturned sides secured to the sides of said central rail member.

6. In a track belt unit, a shoe, a central rail member having upwardly extending sides secured to said shoe, and side rail members having a base secured to said shoe and upwardly extending rails provided with bent over flanges.

7. In a track belt unit, a shoe, a central rail member having a base secured to said shoe and sides forming rails extending upwardly, and side rail members secured to the sides of said central rail member and having rail flanges projecting therefrom and supported by the sides of said central rail member.

8. In a track belt unit, a shoe, a central rail member having a base secured to said shoe and sides extending upward therefrom forming rails the top edges thereof having recesses, and side rail members secured to said shoe having flanges bent over and supported within the recesses in the top edges of the sides of said central rail member.

In testimony whereof, I hereunto affix my signature.

EDWARD GRUBER.